Sept. 29, 1953     W. D. McINTYRE     2,653,681
SHOCK ABSORBER
Filed Nov. 17, 1949     2 Sheets—Sheet 1
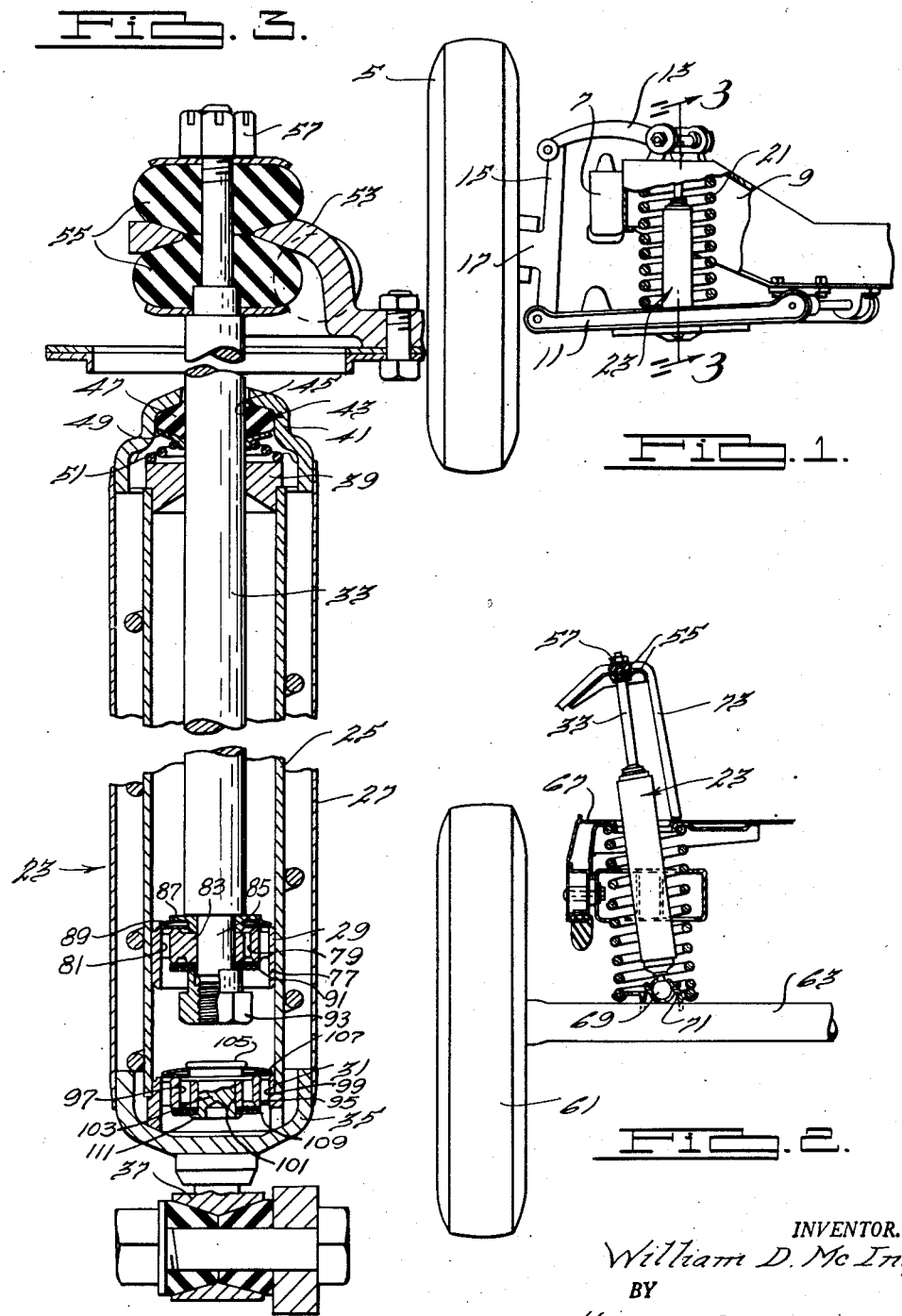
INVENTOR.
William D. McIntyre

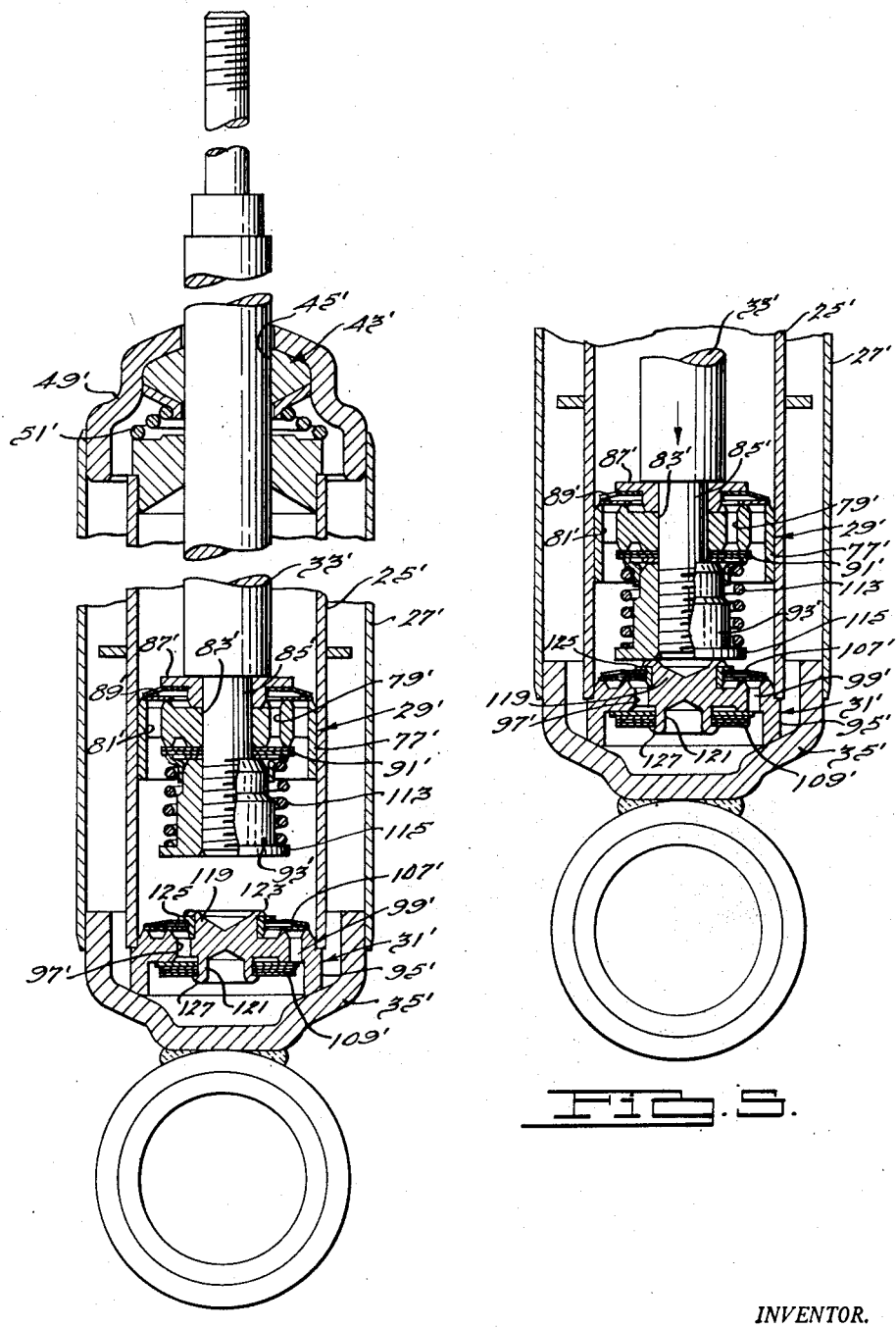

Patented Sept. 29, 1953

2,653,681

UNITED STATES PATENT OFFICE 2,653,681

SHOCK ABSORBER

William D. McIntyre, Monroe, Mich., assignor to Patent Development Company, Monroe, Mich., a partnership Application November 17, 1949, Serial No. 127,850

2 Claims. (Cl. 188—88)

This invention relates to vehicle suspensions and more particularly to shock absorbers and a novel means of mounting the same in a vehicle suspension, and is a continuation in part of applicant's patent application for improvements in Shock Absorber and Vehicle Mounting Arrangement Therefor, filed April 21, 1949, Serial No. 88,824, now abandoned.

Heretofore direct-acting, tubular, hydraulic shock absorbers, which have been used in vehicle suspension systems, have had a dust tube or stone guard connected with and encompassing the free end of the piston rod which projects outwardly beyond the pressure cylinder thereof. The use of such a dust tube has always been thought to be necessary to prevent the accumulation of dust, dirt or other foreign material on the piston rod, which might work its way down into the pressure cylinder of the shock absorber and adversely affect the operation thereof. A second purpose of dust tubes has been to protect the externally disposed portion of the piston rod against abutment by stones, rocks or the like, which would damage the rod by denting or burring it, and in turn would cause damage to the seal between the rod and pressure cylinder so as to adversely affect the operation of the shock absorber.

The applicant has found through extensive tests and experimental work that the dust tube may be eliminated from the shock absorber, thus affecting a saving of approximately five percent (5%) of the shock absorber manufacturing cost, if the piston rod of the shock absorber is plated or otherwise suitably surface treated, and if the shock absorber is mounted in the vehicle in such a manner that a portion of the vehicle or the vehicle suspension system will at least partially embrace the externally disposed portion of the piston rod, at all times. This mounting arrangement permits the utilization of a portion of the vehicle or vehicle suspension as a protector for the piston rod against abutment by stones, rocks or the like. At the same time, the applicant has provided a seal between the piston rod and the pressure cylinder which will prevent the ingress of any dust, dirt or other foreign material into the pressure cylinder of the shock absorber, even though the exterior portion of the shock absorber is not surrounded by a dust shield or tube.

The dust tube of the heretofore used direct-acting shock absorbers has also served as a stop for preventing the piston of the shock absorber from engaging or bottoming on the compression or base valve in the lower end of the shock absorber pressure cylinder. That is, the dust tube engages the upper end of the pressure cylinder or reserve tube, when the piston is moved toward the base valve, so as to prevent the bottoming of the piston and base valve. However, when the dust tube is removed from the shock absorber assembly the stop for preventing the bottoming of the piston on the base valve is also removed. While, when a shock absorber is mounted on an operating vehicle, the piston will not bottom against the base valve, bottoming may occur during handling, shipment and installing of the shock absorber, and such bottoming, with ordinary shock absorber constructions, might damage the fluid flow control valves of the piston assembly and base valve assembly, and thereby adversely affect the operation of the shock absorber. Applicant has, however, overcome this problem by providing novel piston and base valve assembly constructions so that the piston may bottom on the base valve assembly without damaging any of the fluid control valves.

It is, therefore, an object of this invention to provide a tubular direct-acting hydraulic shock absorber which is relatively inexpensive to manufacture and which is exceptionally durable in use.

It is a further object of this invention to provide a shock absorber in which a portion of the piston rod projects outwardly through and beyond the pressure cylinder of the shock absorber and is plated so as to prevent undue wear of the seal between the shock absorber piston rod and pressure cylinder.

It is a still further object of this invention to provide a vehicle suspension system in which a tubular, direct-acting shock absorber is connected between sprung and unsprung portions of the vehicle, in such a manner that the externally disposed portion of the piston rod is embraced, or at least partially embraced, at all times by a portion of the vehicle or vehicle suspension, whereby such portion will act as a stone or rock deflector for the shock absorber.

It is a still further object of this invention to provide in a shock absorber of the aforementioned type, piston and base valve assembly constructions so that the piston may bottom on the base valve without damaging any of the shock absorber fluid flow control valve members.

These and other objects of this invention will become apparent from the following detailed description, taken in conjunction with the accompanying drawings, in which:

Figure 1 is a fragmentary front view, partially in section and partially in elevation, of a portion of a vehicle and a vehicle front suspension incorporating the shock absorber and mounting arrangement of this invention;

Fig. 2 is a view similar to Fig. 1 of a vehicle rear suspension;

Fig. 3 is an enlarged sectional view of the structure illustrated in Fig. 1, taken along the line 3—3 thereof;

Fig. 4 is a longitudinal sectional view of a further embodiment of the shock absorber of this invention, showing the shock absorber piston assembly in spaced relation to the base valve assembly; and Fig. 5 is a sectional view similar to Fig. 4, showing the piston assembly bottomed on the base valve assembly.

Referring now to the drawings, and more particularly to Fig. 1, it will be seen that a vehicle front ground-engaging wheel 5 is connected to the vehicle frame for vertical movement by means of a suitable independent wheel suspension. The vehicle frame includes longitudinal frame members 7, which are interconnected by means of a suitable cross frame member 9. The independent wheel suspension illustrated, includes a lower control arm 11 and an upper control arm 13, which are pivotally mounted at their inner ends to the vehicle cross frame member 9. The outer ends of the upper and lower control arms 13 and 11 are pivotally connected together by means of a vertically extending steering knuckle 15, which carries a king pin assembly 17 on which the wheel 5 is mounted. A coil spring 21 is disposed between the lower control arm 11 and the vehicle cross frame member 9, adjacent the outer end of the latter. Such a construction is, of course, conventional in the suspension art, and it will be appreciated that any suitable independent wheel suspension may be employed.

Extending vertically through the coil spring 21 is a tubular, direct-acting, hydraulic shock absorber 23, which, as can be seen in Fig. 3, comprises a pair of concentric tubular members 25 and 27, the first of which forms a pressure cylinder in which a piston assembly 29 is slidably disposed, and the latter of which provides a reserve chamber for hydraulic fluid, in a conventional manner. The lower end of the tubular member 25 is normally closed by means of a ported base compression valve assembly 31, which provides fluid connection between the lower end of the pressure cylinder and the reserve chamber, in order to permit fluid to flow into and out of the pressure cylinder, in accordance with displacement caused by a piston rod 33, which has its lower end connected to the piston 29 and its upper end projecting outwardly beyond the pressure cylinder 25. The lower end of the reserve tube 27 is closed by means of a suitable end cap or closure member 35, which carries a suitable attaching member 37, which may be connected to the lower control arm 11 in any suitable manner such as that illustrated in applicant's prior Patent No. 2,314,505 issued March 23, 1943.

The upper end of the pressure tube 25 is closed by means of a suitable guide element 39 for the piston rod 33 while the upper end of the reserve tube 27 is closed by means of a suitable end cap or closure member 41. A seal assembly 43 is disposed between the rod guide element 39 and the end cap 41, and is centrally apertured at 45 to permit the piston rod 33 to slidably project therethrough. The seal assembly 43 illustrated in the drawing comprises a rubber seal 47 which surrounds the piston rod and is confined within the upper portion of the end cap 41 by means of a retainer element 49 and spring 51, the lowermost convolution of which seats upon the upper face of the rod guide element 39. The extreme upper end of the piston rod 33, which is disposed exteriorly of the pressure cylinder and end cap 41, is connected to the vehicle cross frame member 9, in any suitable manner. It is illustrated as being connected to a bell or hat-shaped bracket member 53, which in turn is rigidly connected to the frame member 9, by means of rubber washers or biscuits 55 and nut 57, which is threaded on the reduced, threaded, upper end of the rod. The piston rod 33 is preferably of a one-piece construction and has its opposite ends reduced in diameter for connection with the piston 29 and the vehicle frame member 9, as can be clearly seen in the drawings.

It should be noted that the upper end portion of the piston rod 33 is not surrounded by a dust tube or shield or any other portion of the shock absorber. By eliminating the use of any sort of shock absorber, dust or stone protector around the exteriorly disposed portion of the piston rod 33, a saving of five percent (5%) of the manufacturing cost of the shock absorber is made, which in turn amounts to a total saving at the present time of from eight (8) to twenty (20) cents per car, depending on the type of shock absorber used, where four shock absorbers are employed. This large saving can, of course, be easily appreciated when it is considered that in the past a tubular member was always connected with the upper end of the piston rod and telescoped over the pressure tube 27, and that the use of such a tube necessarily added to the cost of the manufacture of the shock absorber.

In order to make the shock absorber exceptionally durable in operation, when it is mounted in a vehicle without a dust tube, it has been found to be desirable and especially advantageous to plate the piston rod with a suitable wear-resistant material, such as chromium. Such a material prevents corrosion or rusting of the piston rod, which normally would occur with an exposed, unplated steel rod. The presence of corrosion or rust on the piston rod, as it continually moves back and forth through the shock absorber seal assembly 43, would cause excessive wearing of the rubber seal element 45, which in turn would obviously adversely affect the operation of the shock absorber. As a good shock absorber is of necessity a precise and accurate device, it is essential that no foreign material enter the pressure cylinder, as the presence of such material would affect the operation of the valving on the piston and base valve 29 and 31. Furthermore, excessive wearing of the seal might result in a loss of shock absorber fluid, which likewise would adversely affect the operation of the shock absorber and the control of the vehicle suspension system obtained thereby. However, when the rod 33 is plated in the manner previously described, no excessive wear on the shock absorber seal occurs and even though the shock absorber rod might be engaged or struck by a small object, such as a stone, the plating will prevent corrosion and rust and will, therefore, eliminate excessive wear.

In the front independent suspension, the exterior portion of the shock absorber piston rod 33 is embraced by the coil spring 21, while a small portion is embraced by the bell or hat sectioned frame bracket 53, so that the coil spring acts as a stone deflector or protector for the piston rod and will normally prevent the piston rod from being struck by stones or rocks which might be thrown up towards the piston rod by the vehicle wheels when the vehicle is operating under normal conditions. The use of a shock absorber dust tube or shield is thus eliminated by the mounting arrangement of the shock absorber, whereby the coil spring acts as a stone deflector, and by the use of a plated piston rod which will resist corrosion and excessive wear of the shock absorber seal assembly 43. The applicant has found through exhaustive and extensive tests that this mounting arrangement and shock absorber construction is durable, inexpensive and very satisfactory in operation.

As can be seen in Fig. 2, the vehicle rear ground wheels 61 are mounted on the rear axle 63 and the coil spring 65 is disposed between the axle 63 and the vehicle body 67. The shock absorber 23 extends upwardly through the coil spring 65 and has a ball head 69 on the lower end thereof which is attached to a suitable socket-like bracket 71, which in turn is connected to the axle 63. The upper end of the shock absorber piston rod 33 is connected by means of the rubber biscuits 55 and nut 57 in the upper end of a housing portion 73 of the vehicle body 67. The tops of the pressure cylinder and of the reserve chamber 25 and 27, respectively, are disposed within the lower portion of the housing 73. The piston rod of the shock absorber is, of course, plated in the manner previously described, and it will be seen that the exteriorly disposed portion of the piston rod is at least partially embraced and confined in the vehicle housing 73, so that that portion of the vehicle body acts as a stone protector or deflector for the piston rod 33, in the same manner as the coil spring in the previous embodiment.

In the embodiment illustrated in Fig. 3, the piston assembly 29 includes a piston body 77 having an inner set of ports or openings therethrough 79 and an outer set of ports or openings 81. The piston body 77 is also provided with a central aperture 83, through which the reduced lower end 85 of the piston rod 33 extends. A spacer washer 87 is disposed between the upper face of the piston body 77 and the shoulder at the upper end of the reduced piston rod portion, and a spring-loaded disk valve 89 is supported between the spacer washer and the upper face of the piston body so as to normally prevent the flow of fluid upwardly through the outer set of passageways 81. A laminated disk valve 91 abuts the lower face of the piston body 77 so as to normally prevent the flow of fluid through the inner set of piston passageways 79 in a downward direction. The laminated disk valve 91 is loaded and supported on the lower face of the piston by means of a nut 93 threaded on the lower end of the piston rod reduced portion. The nut 93 secures the piston to the piston rod and at the same time loads the laminated disk valve.

The base valve assembly 31 includes a valve body 95, having an inner set of openings 97 and an outer set of openings 99 therethrough. The valve body also has a central aperture 101, through which the shank portion of a rivet 103 extends. The head of the rivet abuts the upper face of the valve body and has a flange 105 on the extreme upper end thereof for retaining a spring-loaded valve 107 in engagement with the upper face of the valve body so as to normally prevent the flow of fluid upwardly through the outer set of valve body passageways 99. A laminated disk valve 109 engages the lower face of the valve body so as to normally prevent the flow of fluid downwardly through the inner set of valve body passageways 97. The disk valve 109 is loaded and held in normal engagement with the lower face of the valve body by a flange 111 on the lower end of the rivet, which may be formed in any suitable manner such as by a spacing operation.

As the dust tube has been eliminated from the shock absorber of this invention, the normal means for preventing bottoming of the piston assembly on the base valve assembly has been eliminated. However, with the construction of this invention the piston assembly 29 may bottom on the base valve assembly 31 without damaging any of the disk valve members of either of the assemblies. This is possible because the nut 93 on the lower end of the piston rod 33 will engage the upper headed end 105 of the base valve rivet 103. As the head of the rivet is solidly abutting the upper face of the base valve body 95, and as the nut 93 is rigidly connected with the piston rod 33, the engagement of the piston rod nut and upper end of the base valve rivet will not cause any deflection of the base valve springs or disks, or the piston springs or disks, but a solid abutment or positive stop is provided so that no damage to either of the valve assemblies will occur. As has been previously pointed out, the piston assembly 29 will not bottom on the base valve assembly 31 when the shock absorber is mounted on an operating vehicle. However, during handling, shipping and installing of the shock absorbers there is a very definite possibility of the piston assembly 29 bottoming on the base valve assembly 31, and as the stop normally provided by the dust tube has been removed, applicant's construction of the piston and base valve assemblies provides the necessary stop without any danger whatever of damage to the piston and valve assemblies, in a relatively simple, inexpensive and efficient manner.

The shock absorber illustrated in Figs. 4 and 5 is in most respects identical with the shock absorber illustrated in Fig. 3, so that parts in the embodiment illustrated in Figs. 4 and 5, corresponding to parts shown in Fig. 3, are indicated by prime numbers corresponding to the part numbers used in Fig. 3. In the embodiment illustrated in Figs. 4 and 5, the piston assembly 29' is identical with that previously described, with the exception that a coil spring 113 is interposed between a head 115 on the lower end of the piston rod nut and the laminated disk valve 91'. However, as the nut is still threaded on the lower end of the piston rod 33', engagement of the lower end of the nut with the base valve assembly 31' will not cause any loading of or damage to either the laminated disk valve 91' or the spring-loaded disk valve 89'.

The base valve assembly 31' is provided with the inner and outer sets of passageways 97' and 99' and with integral center hub portions 119 and 121 extending above and below the upper and lower faces of the valve body respectively. The spring-loaded disk valve 107' is loaded by spinning a flange 123 on the upper end of the upper hub portion 119, and a spacer washer 125 is interposed between the flange 123 and the upper face of the valve body. The lower laminated disk valve 109' is loaded and held in position by means of a spun flange 127 on the lower hub portion 121 of the valve body. It will thus be seen that in this embodiment the lower end of the piston rod nut can abut the flange 123 on the upper valve body hub portion 119 and such abutment will not cause any deflection of the spring-loaded valve 107', nor any damage thereto, and a positive stop or solid abutment for the piston is provided, in the same manner as in the previous embodiment except that in this embodiment the stop is provided by an integral portion of the valve body rather than by the head of the rivet, as in the previous embodiment. Thus, in both embodiments of this invention novel, inexpensive means are provided for preventing any damage to the shock absorber when the piston assembly bottoms on the base valve assembly.

It will thus be appreciated that by eliminating the shock absorber dust shield and employing a part of the vehicle or vehicle suspension as a stone deflector, a shock absorber, not having a dust tube, may be mounted on a vehicle in a satisfactory manner and in a manner which will permit the use of a more inexpensive shock absorber than has been heretofore possible.

What is claimed is:

1. A tubular, direct-acting, hydraulic shock absorber including a pair of substantially concentric tubular members, one providing a pressure cylinder and the other cooperating with the pressure cylinder to provide a fluid reservoir chamber, means closing the opposite ends of said tubular members and including a base valve assembly disposed in said pressure cylinder adjacent one end thereof and providing for fluid communication between the pressure cylinder and reserve chamber, a piston assembly slidably disposed in said pressure cylinder and including a ported piston body, valve members for controlling the flow of fluid through said piston body, a piston rod having a portion extending through the closure means at the opposite end of the pressure cylinder from said base valve means, means connecting said piston body to said piston rod adjacent one end thereof, the exteriorly disposed portion of said piston rod being unconfined by any part of the shock absorber, said base valve assembly including a valve body, valve members positioned on the upper surface of the said body, said assembly having a rigid, non-flexible part provided with an upper headed end overlapping said valve members and an annular shoulder positioned in direct abutment with a mating supporting surface on said valve body to stop movement of said piston in a direction toward said base valve assembly.

2. A tubular, direct-acting, hydraulic shock absorber including a pair of substantially concentric tubular members, one providing a pressure cylinder and the other cooperating with said pressure cylinder to provide a fluid reservoir chamber, means closing the opposite ends of said tubular members and including a base valve assembly disposed in said pressure cylinder adjacent one end thereof and providing for fluid communication between the pressure cylinder and reserve chamber, a piston assembly slidably disposed in said pressure cylinder and including a ported piston body, disk valve members engaging opposite faces of said piston body for normally preventing the flow of fluid through said body in one direction or the other, a piston rod having one end extending through the closure means for said pressure cylinder at the opposite end thereof from said base valve assembly, the exteriorly disposed portion of said piston rod being unconfined by any part of the shock absorber, the opposite end of said piston rod extending through said piston body, means rigidly connected to the end of the piston rod extending beyond said piston body for securing said piston rod to said body and for normally retaining one of said valve members in engagement with the adjacent face of said piston body, said base valve assembly including a ported valve body, an annular valve member movably carried by said body and normally engaging the upper face of said valve body for normally preventing the flow of fluid through said valve body in one direction, said valve assembly having a portion projecting beyond one face of said valve body into said pressure cylinder and overlapping said valve member, so as to provide a positive stop and rigid abutment against which the means rigidly connected to the piston rod may abut.

WILLIAM D. McINTYRE.

References Cited in the file of this patent

UNITED STATES PATENTS

| Number | Name | Date |
| --- | --- | --- |
| 2,087,451 | Rossman et al. | July 20, 1937 |
| 2,163,254 | Binder et al. | June 20, 1939 |
| 2,314,505 | McIntyre et al. | Mar. 23, 1943 |
| 2,334,597 | Badertscher | Nov. 16, 1943 |
| 2,346,275 | Read et al. | Apr. 11, 1944 |
| 2,373,508 | Snyder | Apr. 10, 1945 |
| 2,426,447 | Gladden et al. | Aug. 26, 1947 |
| 2,578,138 | Janeway et al. | Dec. 11, 1951 |